United States Patent
Miyanohara et al.

(10) Patent No.: US 7,313,272 B2
(45) Date of Patent: Dec. 25, 2007

(54) IMAGE COMPRESSION APPARATUS AND IMAGE PROCESSING SYSTEM

(75) Inventors: Makoto Miyanohara, Hachioji (JP); Motoo Azuma, Tokorozawa (JP)

(73) Assignee: Olympus Corporation, Tokyo (JP)

( * ) Notice: Subject to any disclaimer, the term of this patent is extended or adjusted under 35 U.S.C. 154(b) by 740 days.

(21) Appl. No.: 10/808,306

(22) Filed: Mar. 25, 2004

(65) Prior Publication Data
US 2004/0207737 A1    Oct. 21, 2004

(30) Foreign Application Priority Data
Apr. 15, 2003  (JP)  ............................. 2003-110057

(51) Int. Cl.
*G06K 9/00*  (2006.01)
(52) U.S. Cl. ..................................... 382/166
(58) Field of Classification Search ................ 382/162, 382/166, 167, 232; 375/240, 240.23; 348/272–280
See application file for complete search history.

(56) References Cited

U.S. PATENT DOCUMENTS

| | | | |
|---|---|---|---|
| 5,402,171 A * | 3/1995 | Tagami et al. ........... | 348/219.1 |
| 5,737,017 A * | 4/1998 | Udagawa et al. .......... | 348/280 |
| 6,628,718 B1 * | 9/2003 | Niwamoto ............. | 375/240.23 |
| 6,829,016 B2 * | 12/2004 | Hung ......................... | 348/581 |
| 6,836,289 B2 * | 12/2004 | Koshiba et al. ............. | 348/273 |
| 7,148,925 B2 * | 12/2006 | Osada et al. ................ | 348/275 |

FOREIGN PATENT DOCUMENTS

JP    11112977 A    4/1999

\* cited by examiner

*Primary Examiner*—Jose L. Couso
(74) *Attorney, Agent, or Firm*—Westerman, Hattori, Daniels & Adrian, LLP.

(57) ABSTRACT

Disclosed herein is an image compression apparatus including: a pre-processing means for effecting preprocessing to generate color imaging signals of locations spatially equivalent to the relative locations of pixels on a color filter from color imaging signals outputted from a solid-state imaging device having the color filter having a predetermined color arrangement disposed on a light receiving surface thereof and to convert the color imaging signals into a predetermined arrangement format color by color with keeping color space of the color filter so as to generate image data groups; and an image compression means containing a frequency converting section for treating an image data group arranged in the predetermined arrangement format as one unit to compute spatial frequency components within the one unit, a quantizing section for quantizing the spatial frequency components, and a coding section for coding the quantized spatial frequency components.

13 Claims, 10 Drawing Sheets

PRIMARY-COLOR FILTER

| R | G | R | G |
|---|---|---|---|
| G | B | G | B |
| R | G | R | G |
| G | B | G | B |

FIG. 4B

COMPLEMENTARY-COLOR FILTER

| W | Ye | G | Cy |
|---|----|---|----|
| G | Cy | W | Ye |
| W | Ye | G | Cy |
| G | Cy | W | Ye |

FIG. 5

| | 1 | 2 | 3 | ... | 8 | ... | 16 | ... |
|---|---|---|---|---|---|---|---|---|
| 1 | R' | R' | R' | ... | R' | ... | R' | ... |
| 2 | R' | R' | R' | ... | R' | ... | R' | ... |
| 3 | R' | R' | R' | ... | R' | ... | R' | ... |
| ⋮ | ⋮ | ⋮ | ⋮ | | ⋮ | ... | ⋮ | ... |
| 8 | R' | R' | R' | ... | | ... | ⋮ | ... |
| ⋮ | ⋮ | ⋮ | ⋮ | ⋮ | ⋮ | | ⋮ | ... |
| 16 | R' | R' | R' | ... | ... | ... | | ... |
| | ⋮ | ⋮ | ⋮ | ⋮ | ⋮ | ⋮ | ⋮ | |

IMAGE DATA GROUP R'

FIG. 6

|   | 1 | 2 | 3 | ... | 8 | ... | 16 | ... |
|---|---|---|---|---|---|---|---|---|
| 1 | G' | G' | G' | ... | G' | ... | G' | ... |
| 2 | G' | G' | G' | ... | G' | ... | G' | ... |
| 3 | G' | G' | G' | ... | G' | ... | G' | ... |
| ⋮ | ⋮ | ⋮ | ⋮ |   | ⋮ | ... | ⋮ | ... |
| 8 | G' | G' | G' | ... |   | ... | ⋮ | ... |
| ⋮ | ⋮ | ⋮ | ⋮ | ⋮ | ⋮ |   | ⋮ | ... |
| 16 | G' | G' | G' | ... | ... | ... |   | ... |
|   | ⋮ | ⋮ | ⋮ | ⋮ | ⋮ | ⋮ | ⋮ | ⋮ |

IMAGE DATA GROUP G'

FIG. 7

|   | 1 | 2 | 3 | ... | 8 | ... | 16 | ... |
|---|---|---|---|---|---|---|---|---|
| 1 | B' | B' | B' | ... | B' | ... | B' | ... |
| 2 | B' | B' | B' | ... | B' | ... | B' | ... |
| 3 | B' | B' | B' | ... | B' | ... | B' | ... |
| ⋮ | ⋮ | ⋮ | ⋮ |   | ⋮ | ... | ⋮ | ... |
| 8 | B' | B' | B' | ... |   | ... | ⋮ | ... |
| ⋮ | ⋮ | ⋮ | ⋮ | ⋮ | ⋮ |   | ⋮ | ... |
| 16 | B' | B' | B' | ... | ... | ... |   | ... |
|   | ⋮ | ⋮ | ⋮ | ⋮ | ⋮ | ⋮ | ⋮ | ⋮ |

IMAGE DATA GROUP B'

FIG. 8

PRIMARY-COLOR FILTER

FIG. 9

| | X=1 | X=2 | X=3 | X=4 | X=5 | X=6 | X=7 | X=8 |
|---|---|---|---|---|---|---|---|---|
| | i=0 | i=1 | i=2 | i=3 | i=4 | i=5 | i=6 | i=7 | i=8 |

| | | | | | | | | | |
|---|---|---|---|---|---|---|---|---|---|
| Y=1 | W | Ye | G | Cy | W | Ye | G | Cy | ⋯ |
| Y=2 | G | Cy | W | Ye | G | Cy | W | Ye | ⋯ |
| Y=3 | W | Ye | G | Cy | W | Ye | G | Cy | ⋯ |
| Y=4 | G | Cy | W | Ye | G | Cy | W | Ye | ⋯ |
| Y=5 | W | Ye | G | Cy | W | Ye | G | Cy | ⋯ |
| Y=6 | G | Cy | W | Ye | G | Cy | W | Ye | ⋯ |
| Y=7 | W | Ye | G | Cy | W | Ye | G | Cy | ⋯ |
| Y=8 | G | Cy | W | Ye | G | Cy | W | Ye | ⋯ |

COMPLEMENTARY-COLOR FILTER

IMAGE COMPRESSION APPARATUS AND IMAGE PROCESSING SYSTEM

This application claims benefit of Japanese Patent Application No.2003-110057 filed in Japan on Apr. 15, 2003, the contents of which are incorporated by this reference.

BACKGROUND OF THE INVENTION

The present invention relates to image compression apparatus for compressing color imaging signals and image processing system for effecting compression, expansion and reproduction of color imaging signals, and more particularly relates to image compression apparatus and image processing system suitably used in those products such as a capsular endoscope or mobile phone in which power saving and size reduction are demanded more than image quality.

Figure 1:
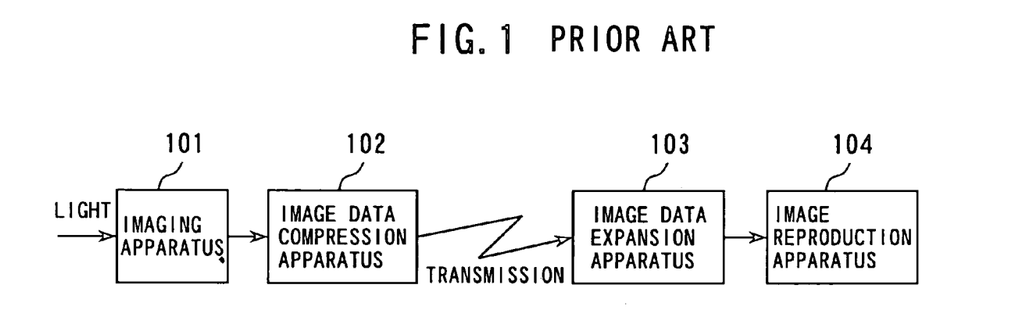
FIG. 1 is a block diagram schematically showing a general image processing system.

FIG. 1 is a block diagram showing an example of a general image processing system. In FIG. 1, numeral 101 denotes an imaging apparatus. The imaging apparatus 101 has a solid-state imaging device for receiving light from an object to output color imaging signals corresponding to the received light amount. The color imaging signals from the solid-state imaging device are transmitted as image data. To achieve an efficient transmission of image data, the image data are usually transmitted by way of processing at an image data compression apparatus 102. The image data compression apparatus 102 effects a compression processing based on the standard for example of JPEG (Joint Photographic Expert Group) or MPEG (Moving Picture Expert Group) for the inputted image data and subsequently transmits the compressed image data.

Supposing a single-chip sensor imaging device, in order to reduce degradation of image data due to the compression processing at the image data compression apparatus 102, a matrix operation is first effected to convert color imaging signals obtained by taking image in the prior-art imaging apparatus 101 into R (red), G (green), B (blue) signals, i.e., a total number of signals three times the total number of the color imaging signals. Subsequently, these color signals are subjected to a separate matrix operation to generate luminance signal Y and color difference signals Cr, Cb which are the signals to be inputted to the image data compression apparatus 102.

At an image data expansion apparatus 103 having received the transmitted, compressed image data, then, an expansion processing based on the standard is effected. Next, an image reproduction apparatus 104 converts Y, Cr, Cb signals obtained by the expansion processing into R, G, B signals by means of an inverse operation of the matrix operation to display an image thereof.

A more detailed explanation will be given below with respect to an image processing system which includes: the imaging apparatus 101 as described; image data compression apparatus 102 for compressing image data outputted from the imaging apparatus 101; image data expansion apparatus 103 for expanding the compressed image data outputted from the image data compression apparatus 102; and image reproduction apparatus 104.

Figure 2:
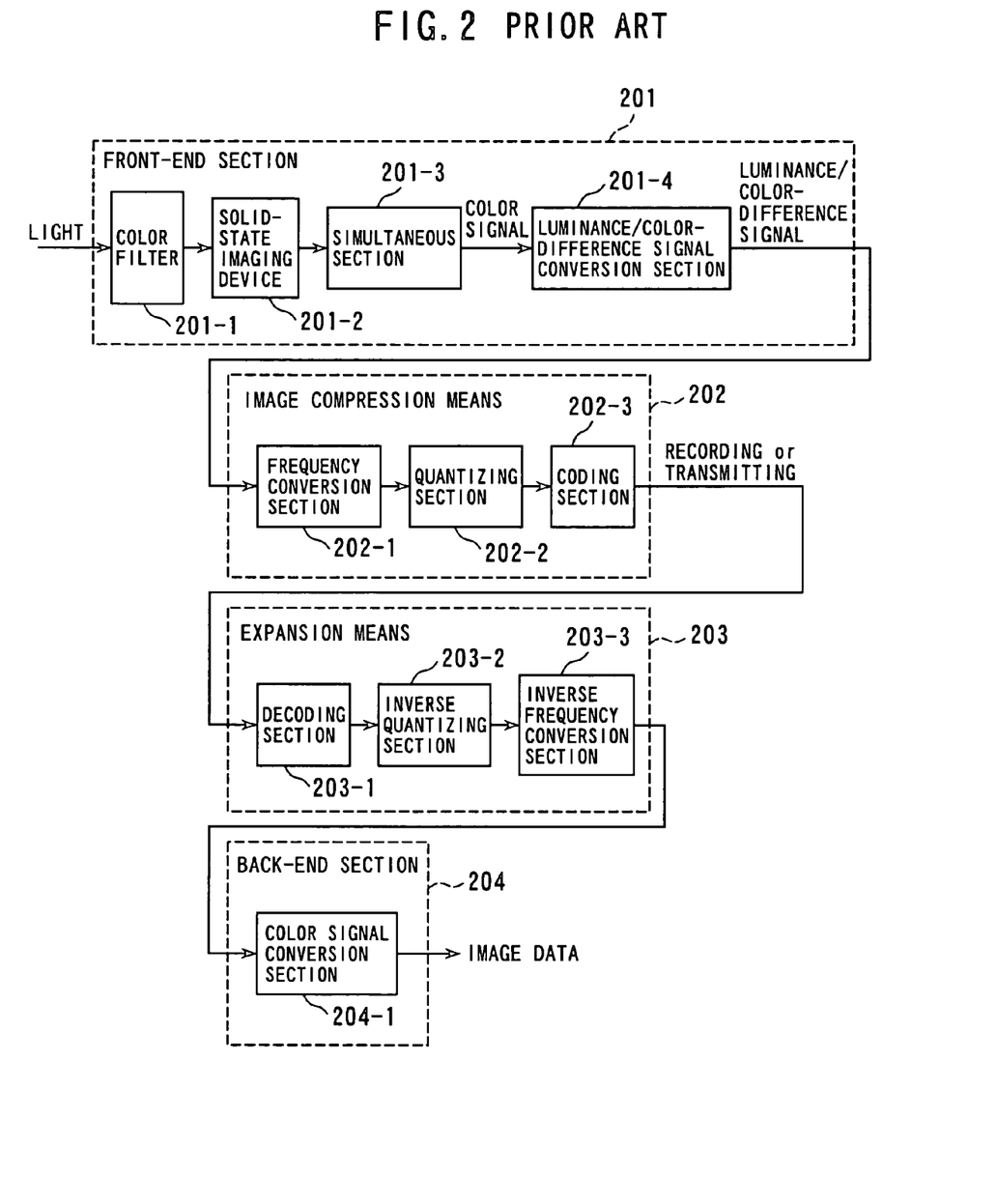
FIG. 2 is a block diagram showing construction of a conventional image processing system including the respective means of image compression, transmission, expansion and reproduction.
Figure 4A:
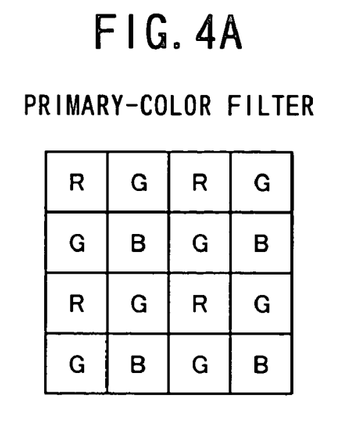
FIGS. 4A and 4B each are a top view showing an example of the construction of color filter.

As shown in FIG. 2, it includes a color filter 201-1, solid-state imaging device 201-2, simultaneous section 201-3, and luminance/color-difference signal converting section 201-4 as its front-end section 201. The color filter 201-1 is formed by arranging R, G, B color filter elements in a Bayer method for example as shown in FIG. 4A. The color filter 201-1 is then stuck onto the front side of the solid-state imaging device 201-2 so that light from an object enters the solid-state imaging device 201-2 through the color filter 201-1.

The solid-state imaging device 201-2 is for receiving the light from the object through the color filter 201-1 to output color imaging signals corresponding to the received light amount and is provided with a plurality of light receiving elements corresponding to each color filter element of the color filter 201-1. The output from the solid-state imaging device 201-2 is inputted to the simultaneous section 201-3 as color imaging signals. The simultaneous section 201-3 is a circuit for generating R, G, B signals based on the color imaging signals outputted from the solid-state imaging device 201-2, and the R, G, B signals are inputted to the luminance/color-difference conversion section 201-4. The luminance/color-difference conversion section 201-4 generates Y, Cr, Cb based on the R, G, B signals outputted from the simultaneous section 201-3.

The principle for generating Y, Cr, Cb signals is generally expressed by the equations of [Formula 1].

$$Y = 0.30 \times R + 0.59 \times G + 0.11 \times B$$

$$Gr = 0.70 \times R + (-0.59) \times G + (-0.11) \times B$$

$$Gb = (-0.30) \times R + (-0.59) \times G + 0.89 \times B \quad \text{[Formula 1]}$$

These Y, Cr, Cb signals are to be inputted as image data to an image compression means 202. As shown in FIG. 2, the image compression means 202 includes a frequency conversion section 202-1, quantizing section 202-2, and coding section 202-3. The frequency conversion section 202-1 is for computing spatial frequency components for Y, Cr, Cb signals within each block. In a standard of JPEG, for example, one block is constituted by eight signals horizontally and eight signals vertically, i.e., 8×8 signals for each block of Y, Cr, Cb, and these 8×8 signals are subjected to DCT (discrete cosine transformation), a type of orthogonal transformation, to be converted into spatial frequency components (DCT coefficient) Fmnij.

The transform equation of the DCT coefficients is generally expressed by [Formula 2]. (Provided that m, n in [Formula 2] indicate horizontal and vertical locations of DCT coefficient; and i, j indicate location of Y, Cr, Cb signals within the block. $0 \leq m,n,i,j \leq 7$.)

$$F_{mnij} = \frac{1}{4} CmCn \cos \frac{(2i+1)m\pi}{16} \cos \frac{(2j+1)n\pi}{16} \quad \text{[Formula 2]}$$

$$CmCn = \begin{cases} \frac{1}{\sqrt{2}} & \text{(when } m, n = 0\text{)} \\ 1 & \text{(when } m, n \neq 0\text{)} \end{cases}$$

The spatial frequency components Fmnij are inputted to the quantizing section 202-2. The quantizing section 202-2 is for effecting quantization of the spatial frequency components Fmnij outputted from the frequency conversion section 202-1. The quantized spatial frequency components outputted from the quantizing section 202-2 are inputted to the coding section 202-3. The coding section 202-3 is for forming code data for the quantized spatial frequency components outputted from the quantizing section 202-2. In a standard of JPEG, for example, after a zigzag scanning, Huffman coding and run length coding are effected on the quantized spatial frequency components outputted from the quantizing section 202-2.

The code data are inputted to an expansion means 203. As shown in FIG. 2, the expansion means 203 includes a decoding section 203-1, inverse quantizing section 203-2, and inverse frequency conversion section 203-3. The expansion means 203 is for effecting an expansion processing corresponding to the compression effected at the image compression means 202 and outputs Y, Cr, Cb signals. In a standard of JPEG, for example, a run-length decoding, Huffman decoding, inverse quantization, and inverse DCT are effected.

The Y, Cr, Cb signals outputted from the expansion means 203 are inputted to a back-end section 204. As shown in FIG. 2, the back-end section 204 includes a color signal converting section 204-1. The color signal converting section is for generating R, G, B signals based on the Y, Cr, Cb signals outputted from the expansion means 203. It should be noted that the principle for generating R, G, B signals is an inverse operation of the principle for generating Y, Cr, Cb signals as shown in [Formula 1].

SUMMARY OF THE INVENTION

It is an object of the present invention to provide an image compression apparatus and image processing system in which the process from an imaging of object through the compression of an image data obtained by the imaging can be effected with saving power so that power saving and downsizing be achieved up to the means for compressing color imaging signals obtained from a solid-state imaging device.

In a first aspect of the invention, there is provided an image compression apparatus for processing color imaging signals outputted from a solid-state imaging device having a color filter having a predetermined color arrangement disposed on a light receiving surface thereof, including: a pre-processing means for effecting preprocessing to generate color imaging signals of locations spatially equivalent to the relative locations of pixels on the color filter from the color imaging signals outputted from the solid-state imaging device and to convert the color imaging signals into a predetermined arrangement format color by color with keeping color space of the color filter so as to generate image data groups; and an image compression means containing a frequency converting section for treating an image data group arranged in the predetermined arrangement format as one unit to compute spatial frequency components within the one unit, a quantizing section for quantizing the spatial frequency components, and a coding section for coding the quantized spatial frequency components.

In a second aspect of the invention, the pre-processing means in the image compression apparatus according to the first aspect sets the spatially equivalent location as a location interiorly dividing a line segment connecting two locations next to each other of a color into an integral ratio and interpolates a color imaging signal at the set location from color imaging signals corresponding to the two locations next to each other of a color.

In a third aspect of the invention, the pre-processing means in the image compression apparatus according to the second aspect is formed so that the total of numbers in the integral ratio is some integer power of 2.

In a fourth aspect of the invention, the pre-processing means in the image compression apparatus according to the third aspect is formed so that the integral ratio is 1:3.

In a fifth aspect of the invention, the pre-processing means in the image compression apparatus according to the first aspect extracts chromatically identical color imaging signals from the color imaging signals and rearranges them into the predetermined arrangement format.

In a sixth aspect of the invention, there is provided an image compression apparatus for processing color imaging signals outputted from a solid-state imaging device having a color filter having a predetermined color arrangement disposed on a light receiving surface thereof, including: a pre-processing means for treating a plurality of chromatically identical color imaging signals with keeping color space of the color filter contained in a predetermined region as one unit to compute spatial frequency components in the one unit with a linear operation; a quantizing section for quantizing the spatial frequency components; and a coding section for coding the quantized spatial frequency components.

In a seventh aspect of the invention, the pre-processing means in the image compression apparatus according to the sixth aspect generates color imaging signals of locations spatially equivalent to the relative locations of pixels on the color filter from color imaging signals and effects the computation processing of the spatial frequency components based on the generated color imaging signals.

In an eighth aspect of the invention, the pre-processing means in the image compression apparatus according to the seventh aspect sets the spatially equivalent location as a location interiorly dividing a line segment connecting two locations next to each other of a color into an integral ratio and interpolates a color imaging signal at the set location from color imaging signals corresponding to the two locations next to each other of a color.

In a ninth aspect of the invention, the pre-processing means in the image compression apparatus according to the eighth aspect is formed so that the total of numbers in the integral ratio is some integer power of 2.

In a tenth aspect of the invention, the pre-processing means in the image compression apparatus according to the ninth aspect is formed so that the integral ratio is 1:3.

In an eleventh aspect of the invention, the pre-processing means in the image compression apparatus according to the sixth aspect rearranges the chromatically identical color imaging signals in the color imaging signals into a predetermined arrangement format and then effects the computation processing of the spatial frequency components.

In a twelfth aspect of the invention, there is provided an image processing system including: an image compression apparatus for processing color imaging signals outputted from a solid-state imaging device having a color filter having a predetermined color arrangement disposed on a light receiving surface thereof, the image compression apparatus including a pre-processing means for effecting preprocessing to generate color imaging signals of locations spatially equivalent to the relative locations of pixels on the color filter from the color imaging signals outputted from the solid-state imaging device and to convert the color imaging signals into a predetermined arrangement format color by color with keeping color space of the color filter so as to generate image data groups, and an image compression means containing a frequency converting section for treating an image data group arranged in the predetermined arrangement format as one unit to compute spatial frequency components within the one unit, a quantizing section for quantizing the spatial frequency components, and a coding section for coding the quantized spatial frequency components; an expansion means including a decoding section for decoding spatial frequency components from code data outputted from the image compression apparatus, an inverse quantizing section for effecting an inverse quantization of the decoded spatial frequency components, and an inverse frequency conversion section for computing imaging data color by color based on the inverse-quantized spatial frequency components; and an image data generation means for simultaneously processing the imaging data of each color outputted from the expansion means to generate image data.

In a thirteenth aspect of the invention, there is provided an image processing system including: an image compression apparatus for processing color imaging signals outputted from a solid-state imaging device having a color filter having a predetermined color arrangement disposed on a light receiving surface thereof, the image compression apparatus including a pre-processing means for treating a plurality of chromatically identical color imaging signals with keeping color space of the color filter contained in a predetermined region as one unit to compute spatial frequency components in the one unit with a linear operation, a quantizing section for quantizing the spatial frequency components, and a coding section for coding the quantized spatial frequency components; an expansion means including a decoding section for decoding spatial frequency components from code data outputted from the image compression apparatus, an inverse quantizing section for effecting an inverse quantization of the decoded spatial frequency components, and an inverse frequency conversion section for computing imaging data color by color based on the inverse-quantized spatial frequency components; and an image data generation means for simultaneously processing the imaging data of each color outputted from the expansion means to generate image data.

DESCRIPTION OF THE PREFERRED EMBODIMENTS

Figure 3:
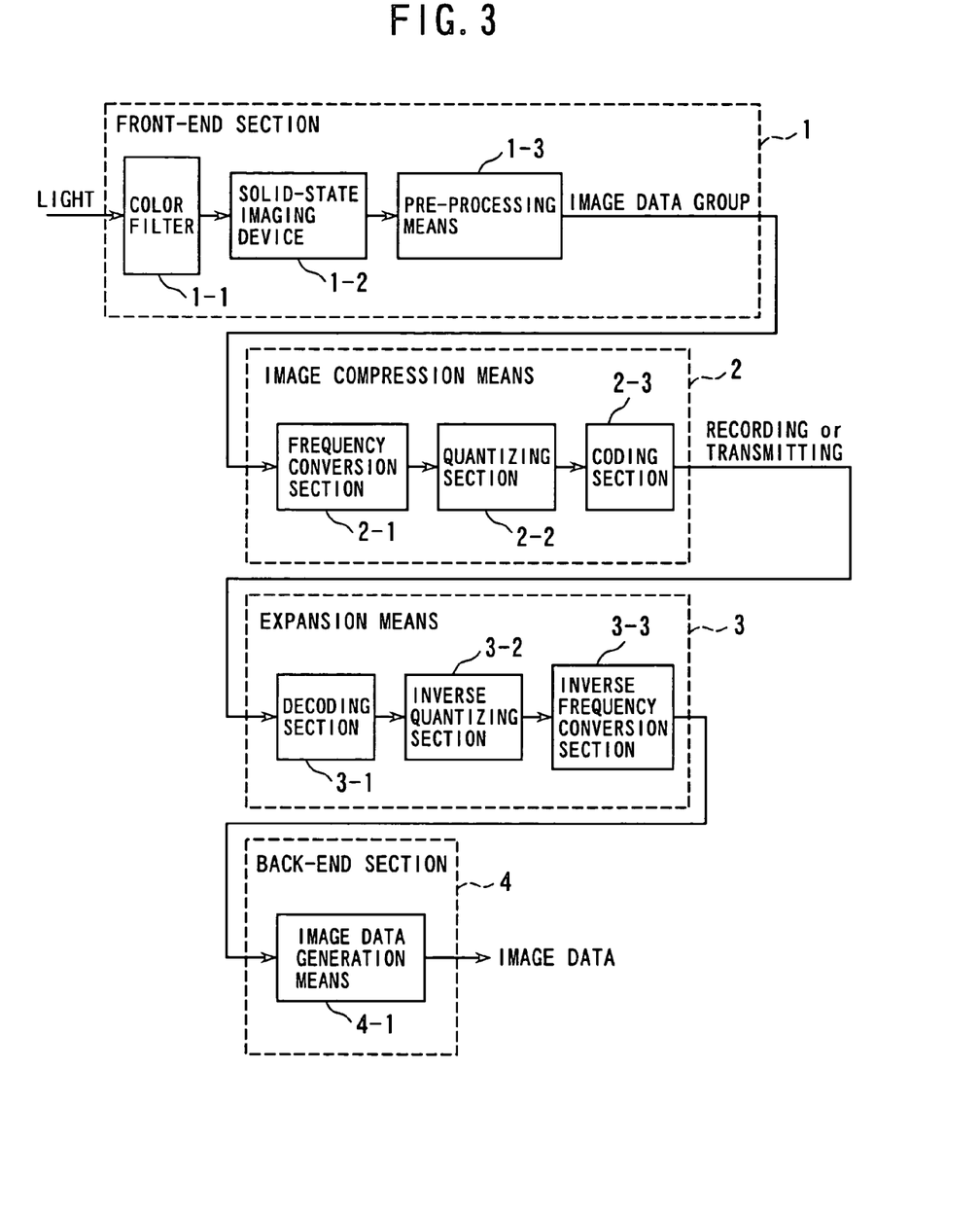
FIG. 3 is a block diagram schematically showing construction of a first embodiment of the image processing system according to the invention, including the pre-processing means for effecting conversion into a predetermined arrangement format color by color with keeping color space to generate image data groups.

Some embodiments of the invention will now be described. FIG. 3 is a block diagram schematically showing the construction of an image processing system according to the first embodiment of the invention. The image processing system includes: a front-end section 1 containing a color filter 1-1, solid-state imaging device 1-2 having the color filter 1-1 disposed on a light receiving surface thereof, and a pre-processing means 1-3; an image compression means 2 containing a frequency conversion section 2-1, quantizing section 2-2 and coding section 2-3; an expansion means 3 containing a decoding section 3-1, inverse quantizing section 3-2, and inverse frequency conversion section 3-3; and a back-end section 4 containing an image data generation means 4-1.

Figure 4B:
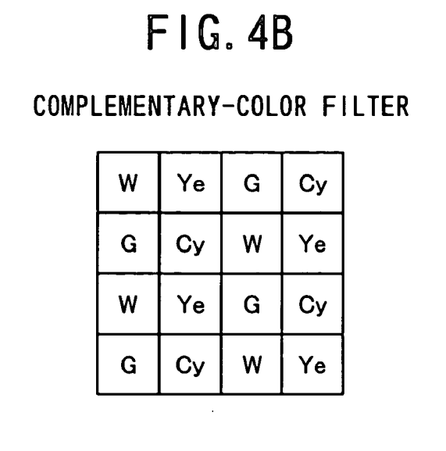

The front-end section 1 is for generating image data groups converted into a predetermined arrangement format without changing color space of the color filter 1-1 and as previously described includes the color filter 1-1, solid-state imaging device 1-2, and pre-processing means 1-3. The color filter 1-1 is formed for example as shown in FIG. 4A by a primary-color filter in which the color filter elements of R (red), G (green), B (blue) are arranged in Bayer method. The color filter 1-1 is disposed on a light receiving surface of the solid-state imaging device 1-2 so that light from an object enters the solid-state imaging device 1-2 through each color filter element. It should be noted that the color filter 1-1 may also be a complementary-color filter as shown in FIG. 4B.

The solid-state imaging device 1-2 is for receiving the light from the object through the color filter 1-1 to output color imaging signals corresponding to received light amount thereof and has a plurality of light receiving elements corresponding to color filter 1-1. The pre-processing means 1-3 is for generating image data groups R', G', B' converted into a predetermined arrangement format from all-color imaging signals R, G, B outputted from the solid-state imaging device 1-2 without changing color space (R, G, B) thereof on the basis of the placement of each color filter element of the color filter 1-1. The method for generating image data groups R', G', B' will be described later.

Figure 5:
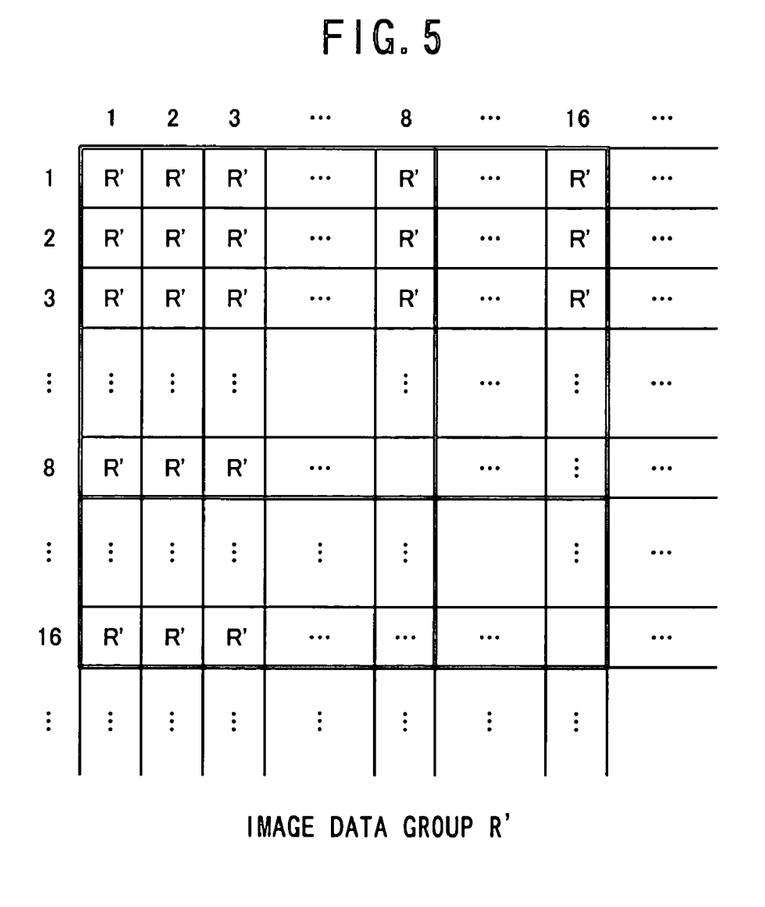
FIG. 5 illustrates an image data group R (blocked) to be inputted to the frequency conversion section in the first embodiment.
Figure 6:
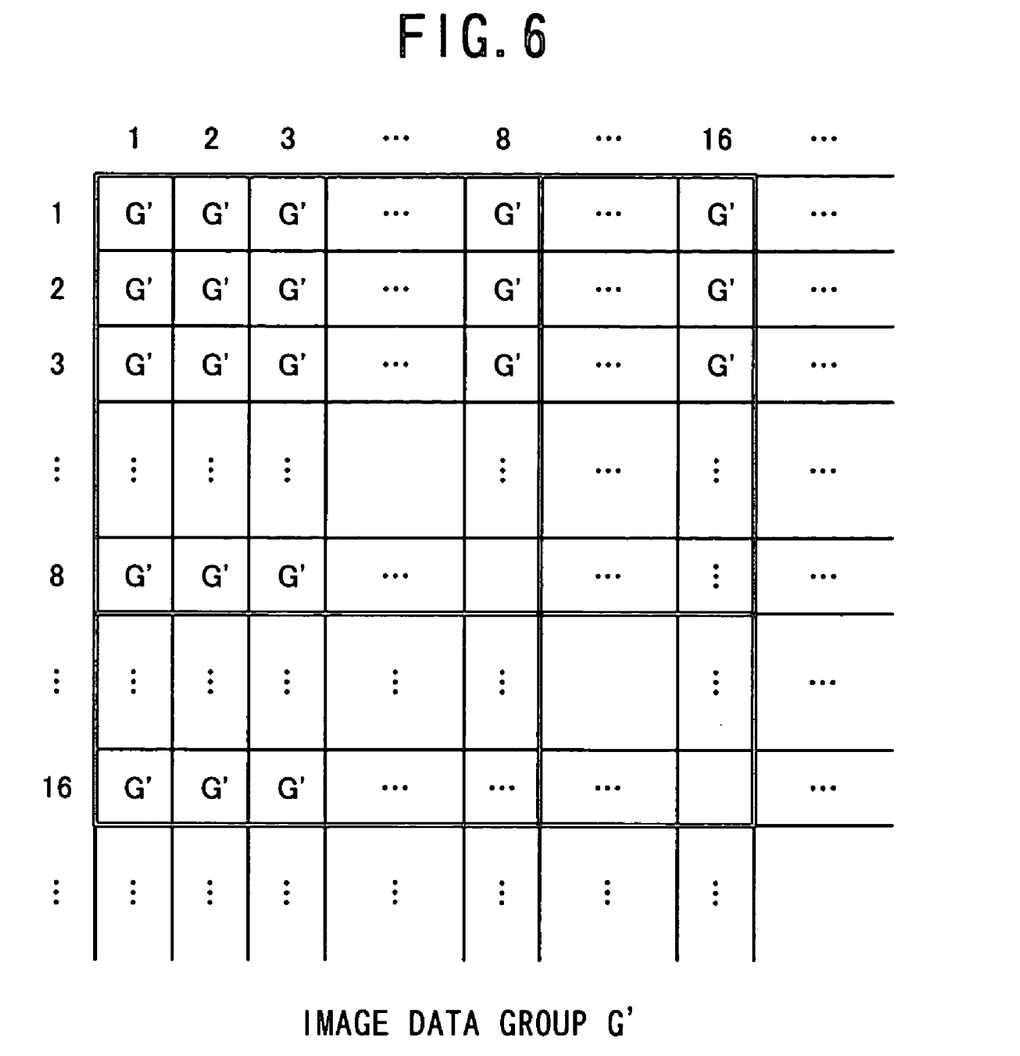
FIG. 6 illustrates an image data group G (blocked) to be inputted to the frequency conversion section in the first embodiment.
Figure 7:
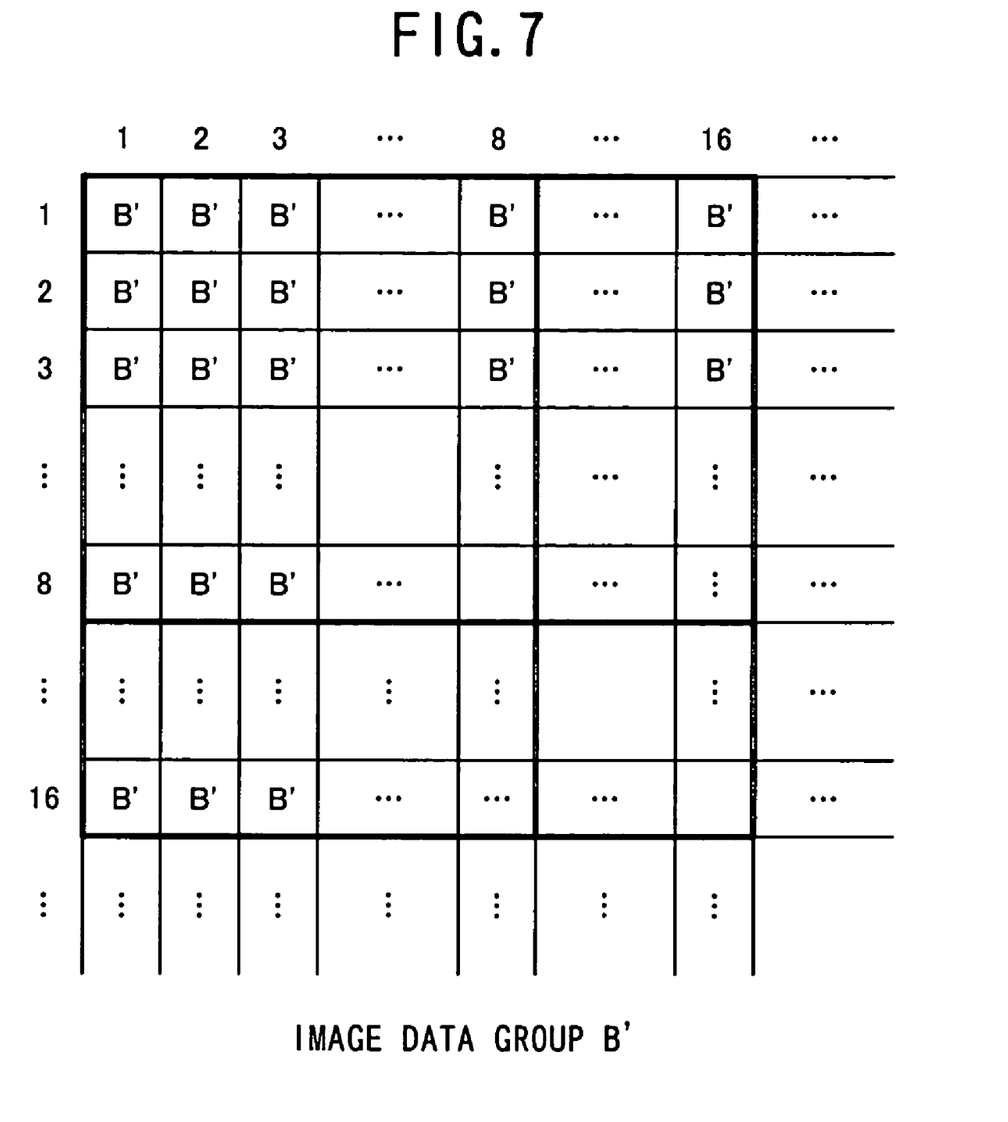
FIG. 7 illustrates an image data group B (blocked) to be inputted to the frequency conversion section in the first embodiment.

A description will now be given with respect to the case of using JPEG of the image processing CODEC for the image compression means 2 and expansion means 3. The data to be inputted to JPEG usually are image data of luminance signal and color-difference signals, and the luminance signal Y and color-difference signals Cr, Cb are formed into unit blocks of [8-signal horizontal×8-signal vertical] for each signal type. In the present embodiment, the input data to be treated are [8-signal horizontal×8-signal vertical] blocks formed for each color data type as shown in FIGS. 5 to 7 of the data outputted from the pre-processing means 1-3.

The image compression means 2 first effects DCT (discrete cosine transformation) at the frequency conversion section 2-1 so as convert the input data into spatial frequency components by units of 8×8 block to be outputted. Next at the quantizing section 2-2, quantization is effected on the above described spatial frequency components outputted from the frequency conversion section 2-1. Further, data obtained by effecting a zigzag scanning on the quantized spatial frequency components outputted at the quantizing section 2-2 are subjected to Huffman coding and run length coding at the coding section 2-3. The code data compressed as described above are retained as recorded for example to a memory or are transmitted.

The transmitted code data are inputted to the expansion means 3. The expansion means 3 is for effecting decoding on the code data encoded at the image compression means 2. The run length decoding and Huffman decoding are effected at the decoding section 3-1, and an inverse quantization at the inverse quantizing section 3-2 and an inverse DCT at the inverse frequency conversion section 3-3 are effected. The image data generation means 4-1 of the back-end section 4 performs an interpolation for each color data on the data obtained from the expansion means 3 and effects simultaneous processing for producing R, G, B signals to generate image data.

The operation of the pre-processing means 1-3 for generating image data groups of the present embodiment will now be described. The respective components of each group of the image data groups R', G', B' as shown in FIGS. 5 to 7 (the code for identifying each component being omitted) are obtained by an operation from two pixels of the same color data that are next to each other in an up and down or right and left direction.

Figure 8:
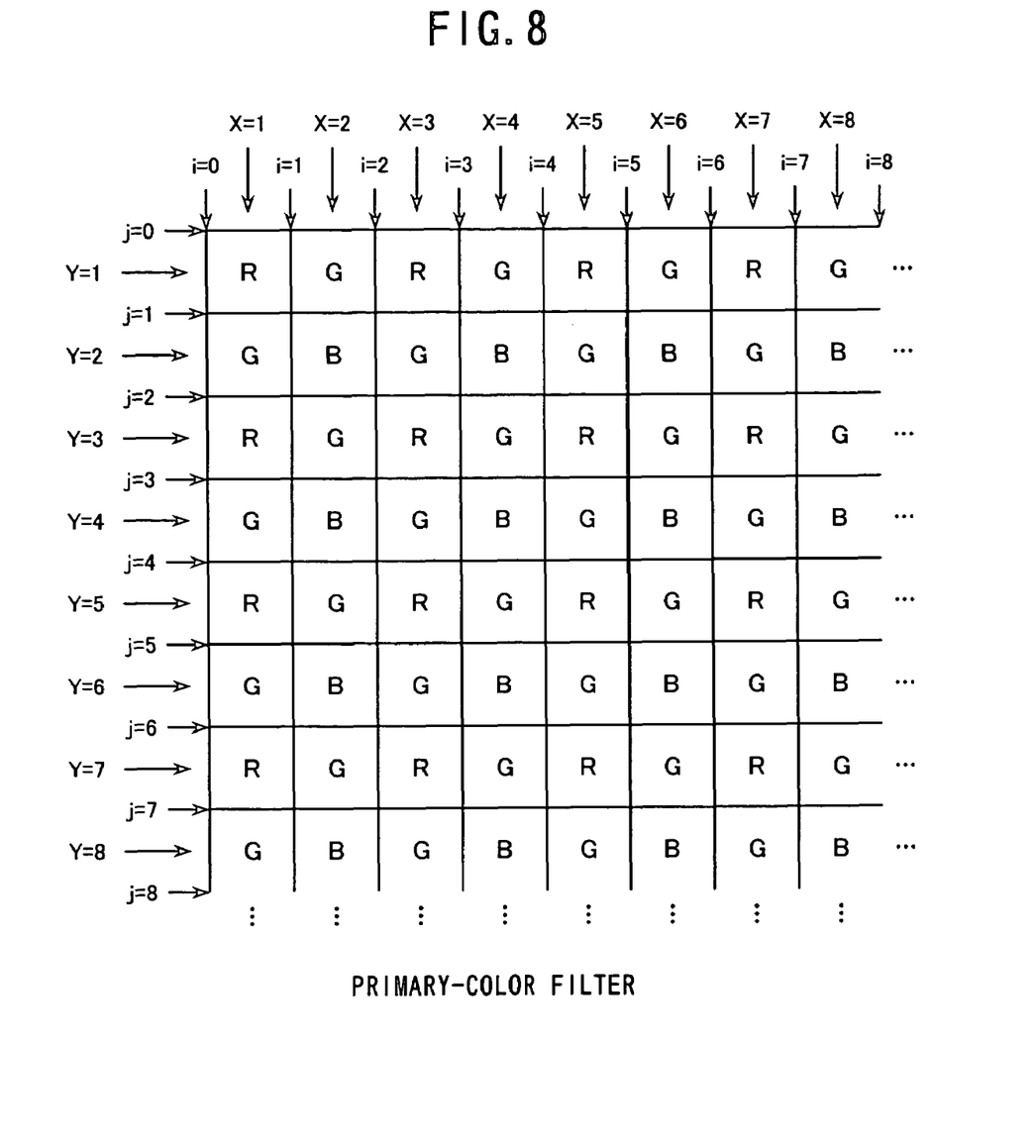
FIG. 8 illustrates the relative positions between the pixels of a solid-state imaging device corresponding to the color arrangement of a primary-color filter and the outputting of image data group obtained based on color imaging signals outputted from each pixel thereof.

The operation method for each component will now be described. First the codes to be used in the following will be described. FIG. 8 typically represents a light receiving surface of the solid-state imaging device 1-2, and R, G, B in the figure indicate the pixels for receiving light transmitted through the primary-color filters R, G, B, respectively, of the color filter 1-1. It is supposed here that, when (1,1) are the coordinates of pixel R at the upper-left corner in FIG. 8, the coordinates of pixel A at the location horizontally X and vertically Y from such pixel R are (X,Y), and the output from pixel A is represented by $A_{X,Y}$.

Further, referring to FIG. 8, j=1 is provided at a middle point of Y=1 and Y=2 in order to two-dimensionally indicate each component of each image data group on the primary-color filter of FIG. 8. Thus j=1 occurs on the horizontal line that separates pixel (X,1) and pixel (X,2) from each other in FIG. 8. Then j=2, j=3, . . . are assigned to the horizontal lines similarly provided below the horizontal line of j=1, and j=0 is assigned to the uppermost horizontal line. The coordinates at horizontally X and vertically j are then indicated by (X,j) so that the image data group generated at the location of these coordinates is represented by $A'_{X,j}$. Also, i=0, i=1, . . . are similarly provided along the vertical lines.

Now, after generating each component of each image data group based on the principle in the following for all color imaging signals outputted from the solid-state imaging device 1-2, an image data group R', G', B' is formed and outputted to the image compression means 2.

Figure 10:
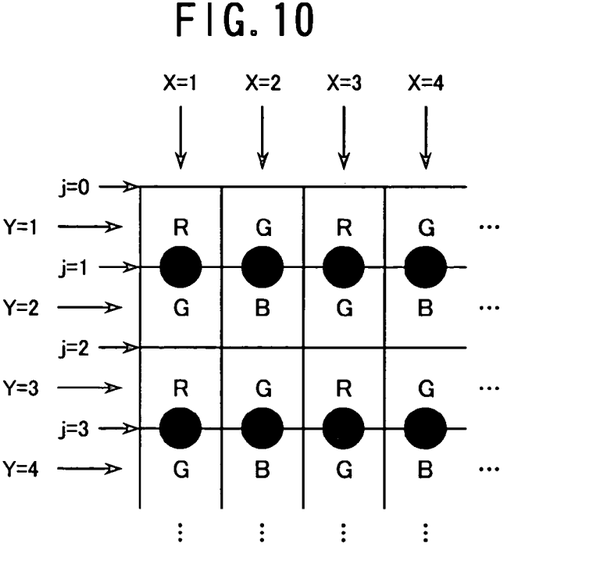
FIG. 10 illustrates the relative position of image data group generated in the first embodiment with respect to the pixels of the color filter.

In the case of using the primary-color filter shown in FIG. 8, in order to make the relative position of each component of image data group to a spatially equivalent location, each component of each image data group is set as indicated by "●" dot on the primary-color filter in FIG. 10 so that it occurs at a location interiorly dividing a line segment connecting two locations next to each other of a color to 1:3. Each component of each image data group is expressed by the equations of [Formula 3] by using R, G, B pixels on the primary-color filter (provided that each signal is outputted only when j is an odd number).

$$R'_{X,j} = R_{X,j} \times \tfrac{3}{4} + R_{X(j+2)} \times \tfrac{1}{4}$$

(Outputted only when X is an odd number)

$$G'_{X,j} = G_{X(j+1)} \times \tfrac{3}{4} + G_{X(j-1)} \times \tfrac{1}{4}$$

(Outputted only when X is an odd number)

$$G'_{X,j} = G_{X,j} \times \tfrac{3}{4} + G_{X(j+2)} \times \tfrac{1}{4}$$

(Outputted only when X is an even number)

$$B'_{X,j} = B_{X(j+1)} \times \tfrac{3}{4} + B_{X(j-1)} \times \tfrac{1}{4} \qquad \text{[Formula 3]}$$

(Outputted only when X is an even number)

Here, in the operation of G' at the time of an odd-number X and of B' at the time an even-number X in the case where j=1, pixel values $G_{X0}$, $B_{X0}$ corresponding to the locations of Y=0, which do not exist in actuality, are to be used as the second term on the right side. In this case, the same pixel value as the first term on the right side or a pixel value obtained by interpolation from a plurality of pixel values of the same color located in the vicinity is used in performing the operation of [Formula 3].

Of "●" dots along j=1 in FIG. 10, one on the left (X=1) corresponds to $R'_{11}$, $G'_{11}$, one next to that on the right (X=2) to $B'_{21}$, $G'_{21}$, one farther on the right (X=3) to $R'_{31}$, $G'_{31}$, and one furthermore on the right (X=4) to $B'_{41}$, $G'_{41}$, respectively. For j=3, one on the left (X=1) corresponds to $R'_{13}$, $G'_{13}$, one next to that on the right (X=2) to $B'_{23}$, $G'_{23}$, one farther on the right (X=3) to $R'_{33}$, $G'_{33}$, and one furthermore on the right (X=4) to $B'_{43}$, $G'_{43}$, respectively.

From [Formula 3], the ratio of the number of components in each image data group (R', G', B') becomes 1: 2:1 and is not different from the ratio of color data in the input data (R, G, B). Accordingly, the total number of components in image data groups R', G', B' becomes equals to the total number of the input data. The pre-processing means 1-3 further reconstructs thus operated $R'_{X,j}$, $G'_{X,j}$, $B'_{X,j}$, color by color and outputs them as the image data groups R', G', B', as shown in FIGS. 5 to 7.

Based on the above operation, since each component of each image data group can be obtained as one at a spatially equivalent location, a correlation for each color can be achieved and it is possible to suppress degradation of image quality due to the compression at the image compression means 2.

The equations of [Formula 3] can be modified to those of [Formula 4].

$$R'_{Xj} = R_{Xj} \times 3/4 + R_{X(j+2)} \times 1/4$$
$$= (3R_{Xj} + R_{X(j+2)}) \times 1/4$$
$$G'_{Xj} = G_{X(j+1)} \times 3/4 + G_{X(j-1)} \times 1/4$$
$$= (3G_{X(j+1)} + G_{X(j-1)}) \times 1/4$$
$$G'_{Xj} = G_{Xj} \times 3/4 + G_{X(j+2)} \times 1/4$$
$$= (3G_{Xj} + G_{X(j+2)}) \times 1/4$$
$$B'_{Xj} = B_{X(j+1)} \times 3/4 + B_{X(j-1)} \times 1/4$$
$$= (3B_{X(j+1)} + B_{X(j-1)}) \times 1/4$$
[Formula 4]

Figure 11:
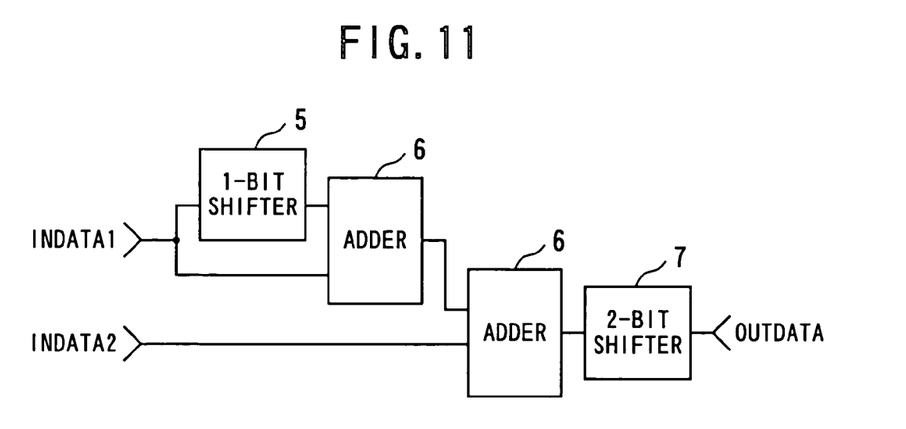
FIG. 11 is a block diagram showing a circuit construction for achieving an example of the operation of the pre-processing means in the first embodiment.

Accordingly, the pre-processing means 1-3 can be achieved as shown in FIG. 11 by a circuit construction only of a 1-bit shifter 5, two adders 6, and a 2-bit shifter 7. It should be noted that, in the processing of this circuit, INDATA1 is tripled by the 1-bit shifter 5 and adder 6, and the resulting value thereof is added to INDATA2 at the adder 6. The resulting value thereof is divided by 4 at the 2-bit shifter 7.

In [Formula 3], each component of each image data group is generated by noticing those locations where j is an odd number on the primary-color filter. On the other hand, when each component is generated by noticing the locations where j is an even number on the primary-color filter, each component is expressed by the equations of [Formula 5] using the pixels R, G, B on the primary-color filter shown in FIG. 8 (each signal being outputted only when j is an even number).

$$R'_{Xj}=R_{X(j+1)}\times\tfrac{3}{4}+R_{X(j-1)}\times\tfrac{1}{4}$$

(Outputted only when X is an odd number)

$$G'_{Xj}=G_{Xj}\times\tfrac{3}{4}+G_{X(j+2)}\times\tfrac{1}{4}$$

(Outputted only when X is an odd number)

$$G'_{Xj}=G_{X(j+1)}\times\tfrac{3}{4}+G_{X(j-1)}\times\tfrac{1}{4}$$

(Outputted only when X is an even number)

$$B'_{Xj}=B_{Xj}\times\tfrac{3}{4}+B_{X(j+2)}\times\tfrac{1}{4}$$
[Formula 5]

(Outputted only when X is an even number)

It should be noted that, in [Formula 3] and [Formula 5], each component is generated by noticing two pixels of the same color data next to each other from upper or lower side. On the other hand, when each component is generated by noticing two pixels of the same color data next to each other from right or left side, each component can be expressed by [Formula 6] (each signal being outputted only when i is an odd number) and [formula 7] (each signal being outputted only when i is an even number) by using pixels R, G, B on the primary-color filter shown in FIG. 8 based on similar concepts as [Formula 3] and [Formula 5].

$$R'_{Xi}=R_{Xi}\times\tfrac{3}{4}+R_{X(i+2)}\times\tfrac{1}{4}$$

(Outputted only when X is an odd number)

$$G'_{Xi}=G_{X(i+1)}\times\tfrac{3}{4}+G_{X(i-1)}\times\tfrac{1}{4}$$

(Outputted only when X is an odd number)

$$G'_{Xi}=G_{Xi}\times\tfrac{3}{4}+G_{X(i+2)}\times\tfrac{1}{4}$$

(Outputted only when X is an even number)

$$B'_{Xi}=B_{X(i+1)}\times\tfrac{3}{4}+B_{X(i-1)}\times\tfrac{1}{4}$$
[Formula 6]

(Outputted only when X is an even number)

$$R'_{Xi}=R_{X(i+1)}\times\tfrac{3}{4}+R_{X(i-1)}\times\tfrac{1}{4}$$

(Outputted only when X is an odd number)

$$G'_{Xi}=G_{Xi}\times\tfrac{3}{4}+G_{X(i+2)}\times\tfrac{1}{4}$$

(Outputted only when X is an odd number)

$$G'_{Xi}=G_{X(i+1)}\times\tfrac{3}{4}+G_{X(i-1)}\times\tfrac{1}{4}$$

(Outputted only when X is an even number)

$$B'_{Xi}=B_{Xi}\times\tfrac{3}{4}+B_{X(i+2)}\times\tfrac{1}{4}$$
[Formula 7]

(Outputted only when X is an even number)

From [Formula 5], [Formula 6] and [Formula 7], similarly as from [Formula 3], the ratio of the component numbers in each image data group (R', G', B') becomes 1:2:1 and is not different from the ratio of color data in the input data (R, G, B), and the total number of components in the image data groups R', G', B' becomes equals to the total number of the input data. The generation of each component by [Formula 5], [Formula 6] and [Formula 7] can also be achieved by the circuit construction shown in FIG. 11 based on a similar modification as that of [Formula 3].

With the construction according to the first embodiment, image data groups R', G', B' as converted into a predetermined arrangement format are generated on the basis of color imaging signals obtained from a solid-state imaging device, without changing color space of R, G, B to another color space such as that of luminance and color-difference signals (Y, Cr, Cb). The compression processing is then effected on these image data groups R', G', B'. Accordingly, it is not necessary to provide a means for generating R, G, B signals based on color imaging signals obtained from the solid-state imaging device to generate Y, Cr, Cb signals based on these R, G, B, signals. It is thereby possible to achieve a power saving in the process up to the compression of the color imaging signals obtained from the solid-state imaging device.

Figure 12:
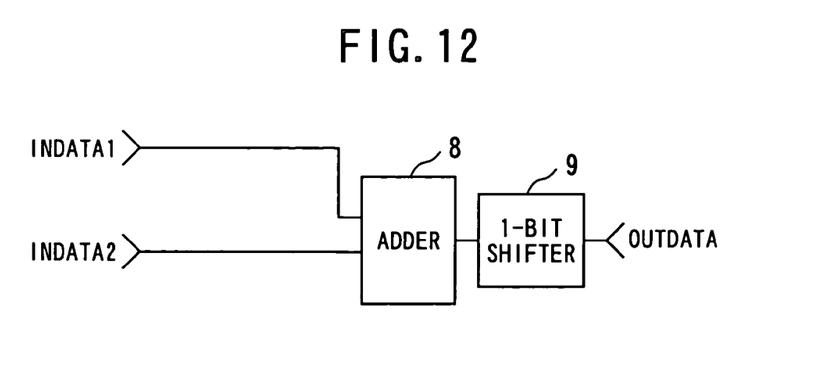
FIG. 12 is a block diagram showing a circuit construction for achieving another example of the operation of the pre-processing means in the first embodiment.

It should be noted that the construction of the pre-processing means has been shown as that for setting the spatially equivalent location in generating image data group R', G', B' to the location interiorly dividing a line segment connecting two locations next to each other of a color to 1:3. It is however also possible to set the black dots on the horizontal line j in FIG. 10 onto the horizontal pixel Y (only at those locations of even-number Y or those of odd-number Y) so as to generate image data groups R', G', B' corresponding to such locations. With this construction, the number of times of operation becomes one half as compared to the setting of the spatially equivalent location in generating image data group R', G', B' to the location interiorly dividing a line segment connecting two locations next to each other of a color to 1: 3. Accordingly, such operation can be achieved by only an adder 8 and a 1-bit shifter 9 as shown in FIG. 12. In this operation circuit, INDATA1 and INDATA2 are added to each other at the adder 8, and the added value is divided by 2 at the 1-bit shifter 9. Further, as the construction of the pre-processing means, it is also possible to simply rearrange those of the same color of color imaging signals R, G, B to generate image data group R', G', B'. With such construction, it is only required to effect the rearrangement processing and an arithmetic operation becomes unnecessary.

Figure 9:
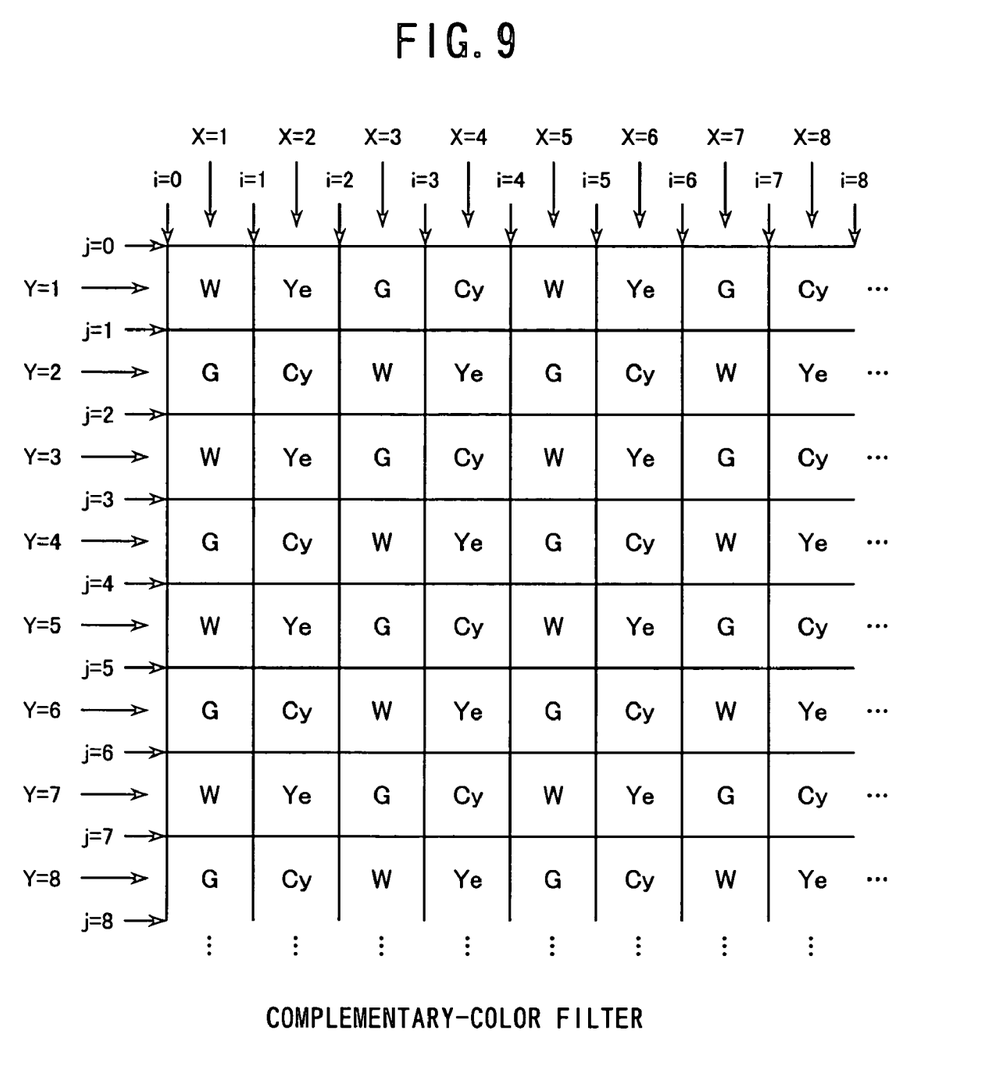
FIG. 9 illustrates the relative positions between the pixels of a solid-state imaging device corresponding to the color arrangement of a complementary-color filter and the outputting of image data group obtained based on color imaging signals outputted from each pixel thereof.

It should be noted that, also in the case of using a complementary-color filter as shown in FIG. 9, a definition similar to the primary-color filter can be given so that pixels W, Ye, G, Cy on the complementary-color filter be used to generate image data groups W', Ye', G', Cy' on the basis of a theory similar to that of the primary-color filter.

Figure 13:
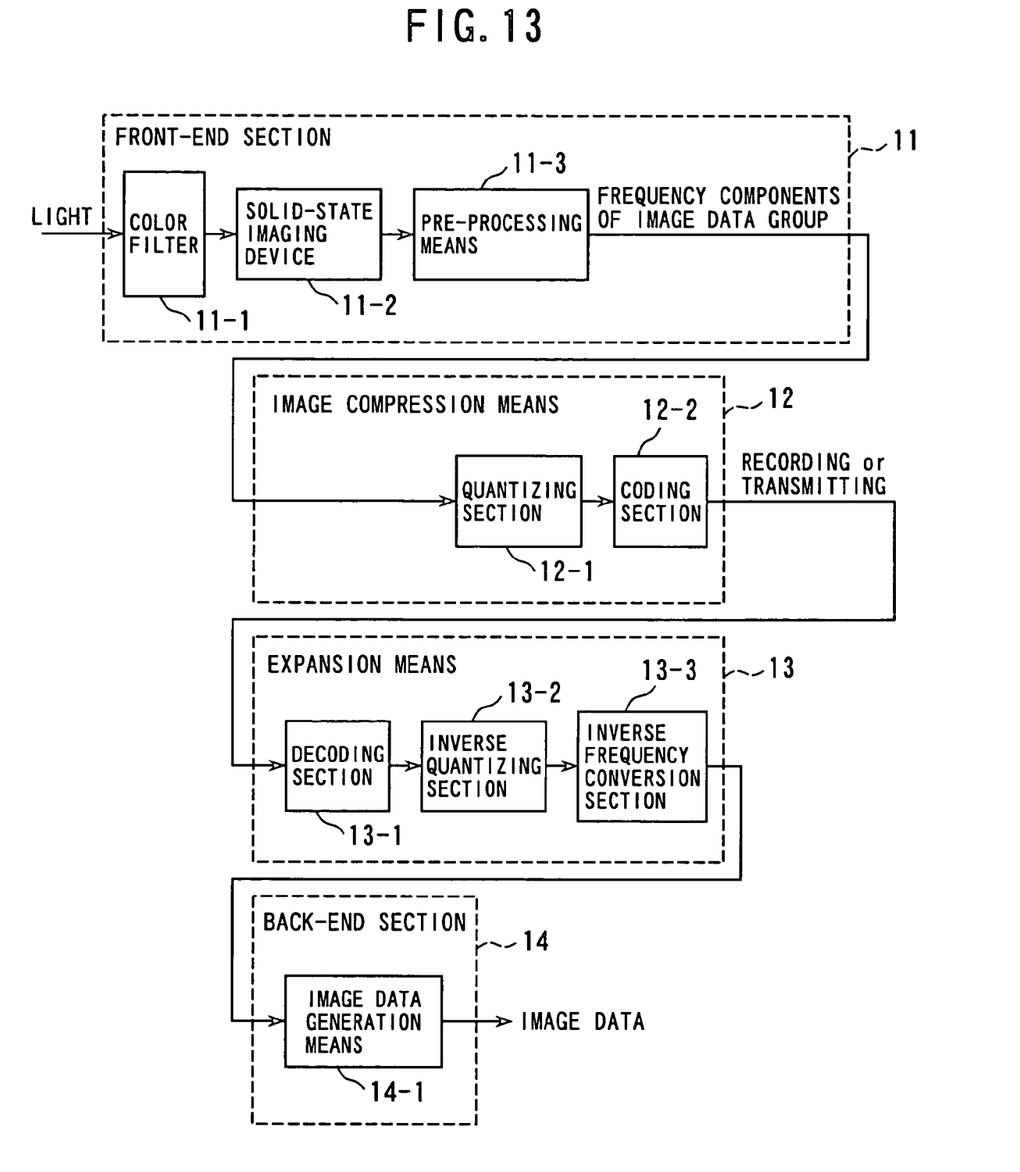
FIG. 13 is a block diagram schematically showing the construction of an image processing system according to a second embodiment of the invention.

A second embodiment will now be described. FIG. 13 is a block diagram schematically showing the construction of an image processing system according to the second embodiment of the invention. The image processing system includes: a front-end section 11 containing a color filter 11-1, solid-state imaging device 11-2, and pre-processing means 11-3; an image compression means 12 containing a quantizing section 12-1, and coding section 12-2; an expansion means 13 containing a decoding section 13-1, inverse quantizing section 13-2, and inverse frequency conversion section 13-3; and a back-end section 14 containing an image data generation means 14-1.

The operation in the present embodiment except the pre-processing means 11-3 is similar to the first embodiment. The pre-processing means 11-3 in this embodiment is for effecting a linear operation on all color imaging signals outputted from the solid-state imaging device 11-2 on the basis of placement of each color filter element of the color filter 11-1 so as to generate spatial frequency components for image data group R', G', B' generated based on the first embodiment.

The operation of the pre-processing means 11-3 in the present embodiment will now be described. It should be noted that the definitions of X, Y, i, j in FIGS. 8 and 9 is similar to those in the first embodiment. In the second embodiment, spatial frequency components for image data group R', G', B' are generated and outputted to the image compression means 12 by effecting a linear operation on all color imaging signals outputted from the solid-state imaging device 11-2 based on the principle as in the following. First, as described in the first embodiment, when a primary-color filter as shown in FIG. 8 is used as the color filter, image data groups R', G', B' are expressed by the equations of [Formula 8] using pixels R, G, B on the primary-color filter (each signal being outputted only when j is an odd number).

$$R'_{Xj} = R_{Xj} \times 3/4 + R_{X(j+2)} \times 1/4$$

(Outputted only when X is an odd number)

$$G'_{Xj} = G_{X(j+1)} \times 3/4 + G_{X(j-1)} \times 1/4$$

(Outputted only when X is an odd number)

$$G'_{Xj} = G_{Xj} \times 3/4 + G_{X(j+2)} \times 1/4$$

(Outputted only when X is an even number)

$$B'_{Xj} = B_{X(j+1)} \times 3/4 + B_{X(j-1)} \times 1/4 \quad [\text{Formula 8}]$$

(Outputted only when X is an even number)

From [Formula 8], the image data groups R', G', B' have a linear relation with respect to the output from pixels R, G, B, respectively. Accordingly, each component $R'_{Xj}$, $G'_{Xj}$, $B'_{Xj}$ of image data group R', G', B' is expressed for example by [Formula 9] using matrices $E^{R'}_{ijXY}$, $E^{G'}_{ijXY}$, $E^{B'}_{ijXY}$, $r_{XY}$, $g_{XY}$, $b_{XY}$.

$$R'_{Xj} = E^{R'}_{ijXY} \times r_{XY}$$

$$G'_{Xj} = E^{G'}_{ijXY} \times g_{XY}$$

$$B'_{Xj} = E^{B'}_{ijXY} \times b_{XY} \quad [\text{Formula 9}]$$

The spatial frequency components of image data group R', G', B', on the other hand, are expressed by using matrix Fmnij as indicated by the equations of [Formula 10] as is known as a prior-art technique.

$$F_{mnij} = \frac{1}{4} CmCn \cos\frac{(2i+1)m\pi}{16} \cos\frac{(2j+1)n\pi}{16} \quad [\text{Formula 10}]$$

$$CmCn = \begin{cases} \frac{1}{\sqrt{2}} & (\text{when } m, n = 0) \\ 1 & (\text{when } m, n \neq 0) \end{cases}$$

Accordingly, the spatial frequency components $R'_{mn}$, $G'_{mn}$, $B'_{mn}$ of each component $R'_{Xj}$, $G'_{Xj}$, $B'_{Xj}$ of image data group R', G', B' are expressed by the equations of [Formula 11] using matrix Fmnij and image data group $R'_{Xj}$, $G'_{Xj}$, $B'_{Xj}$.

$$R'_{mn} = F_{mnij} \times R'_{Xj}$$

$$G'_{mn} = F_{mnij} \times G'_{Xj}$$

$$B'_{mn} = F_{mnij} \times B'_{Xj} \quad [\text{Formula 11}]$$

From [Formula 9] and [Formula 11], the spatial frequency components R'mn, G'mn, B'mn of each component $R'_{Xj}$, $G'_{Xj}$, $B'_{Xj}$ of image data group R', G', B' are expressed by the equations of [Formula 12] by using $r_{XY}$, $g_{XY}$, $b_{XY}$.

$$R'_{mn} = F_{mnij} \times E^{R'}_{ijXY} \times r_{XY}$$

$$G'_{mn} = F_{mnij} \times E^{G'}_{ijXY} \times g_{XY}$$

$$B'_{mn} = F_{mnij} \times E^{B'}_{ijXY} \times b_{XY} \quad [\text{Formula 12}]$$

Here, since matrix $E^{R'}_{ijXY}$, $E^{G'}_{ijXY}$, $E^{B'}_{ijXY}$ in [Formula 9] and matrix Fmnij in [Formula 11] both are a linear operation, [Formula 12] is expressed by the equations of [Formula 13] using a single matrix $W^{R'}_{mnXY}$, $W^{G'}_{mnXY}$, $W^{B'}_{mnXY}$.

$$R'_{mn} = W^{R'}_{mnXY} \times r_{XY}$$

$$G'_{mn} = W^{G'}_{mnXY} \times g_{XY}$$

$$B'_{mn} = W^{B'}_{mnXY} \times b_{xy} \quad [\text{Formula 13}]$$

Accordingly, the spatial frequency components $R'_{mn}$, $G'_{mn}$, $B'_{mn}$ of each component $R'_{Xj}$, $G'_{Xj}$, $B'_{Xj}$ of image data group R', G', B' are obtained as a result of a linear operation by matrix $W^{R'}_{mnXY}$, $W^{G'}_{mnXY}$, $W^{B'}_{mnXY}$ in [Formula 13] effected by the pre-processing means 11-3.

An advantage similar to the first embodiment can be obtained also by the technique for generating spatial frequency components for image data group R', G', B' obtained by simply rearranging those of the same color of color imaging signals R, G, B similarly to the first embodiment, or by the technique for setting the black dots on the horizontal line j in FIG. 10 onto horizontal pixels Y (only at locations where Y is an even number or where it is an odd number) so as to generate spatial frequency components for image data group R', G', B' corresponding to such location.

It should be noted that, also in the case where the complementary-color filter shown in FIG. 9 is used as the color filter, spatial frequency components W'mn, Ye'mn, G'mn, Cy'mn of each component $W'_{Xj}$, $Ye'_{Xj}$, $G'_{Xj}$, $Cy'_{Xj}$ of image data group W', Ye', G', Cy' can be obtained by effecting a linear operation.

According to the present embodiment, the spatial frequency components of image data group R', G', B' in the first embodiment can be directly generated by a linear operation based on color imaging signals obtained from the solid-state imaging device without generating the image data group R', G', B'. Accordingly, in addition to the advantage of the first embodiment, since a means for retaining image data group R', G', B' is not required, a reduction in size can be achieved in the construction up to the compression of color imaging signals obtained from the solid-state imaging device.

As has been described by way of the above embodiments, according to the first aspect of the invention, since image data groups converted into a predetermined arrangement format are generated based on color imaging signals obtained from a solid-state imaging device, there is no need for a means for generating a different color space such as one for generating Y, Cr, Cb signals based on R, G, B signals by generating the R, G, B signals based on color imaging signals obtained from the solid-state imaging device. It is thereby possible to achieve power saving in the image compression apparatus. According to the second and eighth aspects of the invention, since a spatially equivalent location is set as a location interiorly dividing a line segment connecting two locations to an integral ratio, a color imaging signal at the interiorly dividing location can be readily obtained. According to the third and ninth aspects of the invention, since the total of numbers in the integral ratio is some integer power of 2, the obtaining of a color imaging signal at the interiorly dividing location can be achieved by a construction consisting only of adder (multiplier) and shifter. According to the fourth and tenth aspects of the invention, it is possible to provide an image compression apparatus according to the first aspect in which generation of image data groups can be achieved with a relatively simple circuit construction. According to the fifth aspect of the invention, it is possible to provide an image compression apparatus according to the first aspect in which generation of image data group can be achieved with a relatively simple circuit construction.

According to the sixth aspect of the invention, a reduction in size of the image compression apparatus can be achieved, since spatial frequency components of image data group converted into a predetermined arrangement format are directly generated based on color imaging signals obtained from a solid-state imaging device and thus a means for retaining the image data group is not required. According to the seventh aspect of the invention, it is possible to achieve an image compression apparatus according to the sixth aspect in which degradation of image quality due to the compression processing can be suppressed. According to the eleventh aspect of the invention, it is possible to achieve an image compression apparatus according to the sixth aspect in which power saving can be achieved by a simple circuit construction.

According to the twelfth aspect of the invention, image data groups converted into a predetermined arrangement format are generated based on color imaging signals obtained from a solid-state imaging device. Accordingly, a power saving in the image processing system can be achieved, since there is no need for a means for generating a different color space such as one for generating Y, Cr, Cb signals based on R, G, B signals by generating the R, G, B signals based on color imaging signals obtained from the solid-state imaging device. According to the thirteenth aspect of the invention, spatial frequency components of image data group converted into a predetermined arrangement format are directly generated based on color imaging signals obtained from a solid-state imaging device. Accordingly, since a means for retaining the image data group is not required, a reduction in size of the image processing system can be achieved.

What is claimed is:

1. An image compression apparatus for processing color imaging signals outputted from a solid-state imaging device having a color filter having a predetermined color arrangement disposed on a light receiving surface thereof, said image compression apparatus comprising:
   a pre-processing means for effecting preprocessing to generate color imaging signals of locations spatially equivalent to the relative locations of pixels on said color filter from the color imaging signals outputted from said solid-state imaging device and to convert said color imaging signals into a predetermined arrangement format color by color with keeping color space of the color filter so as to generate image data groups; and
   an image compression means comprising a frequency converting section for treating an image data group arranged in said predetermined arrangement format as one unit to compute spatial frequency components within the one unit, a quantizing section for quantizing the spatial frequency components, and a coding section for coding the quantized spatial frequency components.

2. The image compression apparatus according to claim 1, wherein said pre-processing means sets said spatially equivalent location as a location interiorly dividing a line segment connecting two locations next to each other of a color into an integral ratio and interpolates a color imaging signal at the set location from color imaging signals corresponding to the two locations next to each other of a color.

3. The image compression apparatus according to claim 2, wherein said pre-processing means is formed so that the total of numbers in said integral ratio is some integer power of 2.

4. The image compression apparatus according to claim 3, wherein said pre-processing means is formed so that said integral ratio is 1:3.

5. The image compression apparatus according to claim 1, wherein said pre-processing means extracts chromatically identical color imaging signals from the color imaging signals and rearranges them into said predetermined arrangement format.

6. An image compression apparatus for processing color imaging signals outputted from a solid-state imaging device having a color filter having a predetermined color arrangement disposed on a light receiving surface thereof, said image compression apparatus comprising:
   a pre-processing means for treating a plurality of chromatically identical color imaging signals with keeping color space of the color filter contained in a predetermined region as one unit to compute spatial frequency components in the one unit with a linear operation;
   a quantizing section for quantizing the spatial frequency components; and
   a coding section for coding the quantized spatial frequency components.

7. The image compression apparatus according to claim 6, wherein said pre-processing means generates color imaging signals of locations spatially equivalent to the relative locations of pixels on said color filter from color imaging signals and effects the computation processing of said spatial frequency components based on the generated color imaging signals.

8. The image compression apparatus according to claim 7, wherein said pre-processing means sets said spatially equivalent location as a location interiorly dividing a line segment connecting two locations next to each other of a color into an integral ratio and interpolates a color imaging signal at the set location from color imaging signals corresponding to the two locations next to each other of a color.

9. The image compression apparatus according to claim 8, wherein said pre-processing means is formed so that the total of numbers in said integral ratio is some integer power of 2.

10. The image compression apparatus according to claim 9, wherein said pre-processing means is formed so that said integral ratio is 1:3.

11. The image compression apparatus according to claim 6, wherein said pre-processing means rearranges the chromatically identical color imaging signals in the color imaging signals into a predetermined arrangement format and then effects the computation processing of said spatial frequency components.

12. An image processing system comprising:
an image compression apparatus for processing color imaging signals outputted from a solid-state imaging device having a color filter having a predetermined color arrangement disposed on a light receiving surface thereof, said image compression apparatus comprising a pre-processing means for effecting preprocessing to generate color imaging signals of locations spatially equivalent to the relative locations of pixels on said color filter from the color imaging signals outputted from said solid-state imaging device and to convert said color imaging signals into a predetermined arrangement format color by color with keeping color space of the color filter so as to generate image data groups, and an image compression means containing a frequency converting section for treating an image data group arranged in said predetermined arrangement format as one unit to compute spatial frequency components within the one unit, a quantizing section for quantizing the spatial frequency components, and a coding section for coding the quantized spatial frequency components;

an expansion means comprising a decoding section for decoding spatial frequency components from code data outputted from the image compression apparatus, an inverse quantizing section for effecting an inverse quantization of the decoded spatial frequency components, and an inverse frequency conversion section for computing imaging data color by color based on the inverse-quantized spatial frequency components; and an image data generation means for simultaneously processing the imaging data of each color outputted from the expansion means to generate image data.

13. An image processing system comprising:
an image compression apparatus for processing color imaging signals outputted from a solid-state imaging device having a color filter having a predetermined color arrangement disposed on a light receiving surface thereof, said image compression apparatus comprising a pre-processing means for treating a plurality of chromatically identical color imaging signals with keeping color space of the color filter contained in a predetermined region as one unit to compute spatial frequency components in the one unit with a linear operation, a quantizing section for quantizing the spatial frequency components, and a coding section for coding the quantized spatial frequency components;

an expansion means comprising a decoding section for decoding spatial frequency components from code data outputted from the image compression apparatus, an inverse quantizing section for effecting an inverse quantization of the decoded spatial frequency components, and an inverse frequency conversion section for computing imaging data color by color based on the inverse-quantized spatial frequency components; and an image data generation means for simultaneously processing the imaging data of each color outputted from the expansion means to generate image data.

* * * * *